3,091,576
METHOD OF 2-HYDROXYLATING PREGNENES AND PREGNADIENES WITH STREPTOMYCES GRISEUS
Louis I. Feldman, Spring Valley, N.Y., Neil E. Rigler, Ridgewood, N.J., Chester E. Holmlund, Pearl River, N.Y., and Barbara E. Nielsen, Ridgewood, N.J., assignors to American Cyanamid Company, Stamford, Conn., a corporation of Maine
No Drawing. Filed Apr. 27, 1962, Ser. No. 190,799
4 Claims. (Cl. 195—51)

This invention relates to a method for the microbiological hydroxylation of steroids. More particularly, it relates to the 2β-hydroxylation of steroids of the pregnane series.

This application is in part a continuation-in-part of our copending application Serial No. 74,244, filed December 7, 1960.

The process of the present invention will prepare steroids which can be illustrated by the following general formula:

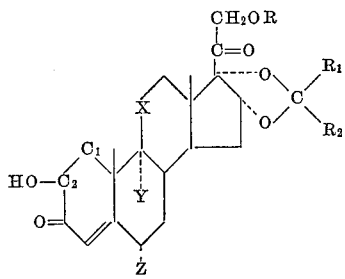

wherein $C_2$—$C_1$ is a divalent radical selected from the group consisting of —$CH_2$—$CH_2$— and —CH=CH— radicals, X is a radical selected from the group consisting of

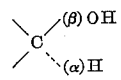

and O=C< radicals, R is selected from the group consisting of hydrogen and lower alkanoyl radicals, Y and Z are selected from the group consisting of hydrogen and halogen atoms and $R_1$ and $R_2$ are the same or different and are hydrogen atoms or lower alkyl radicals.

The microbiological process of the present invention is carried out under aerobic conditions in the presence of a suitable nutrient medium at a temperature within the range of from about 20° C. to about 40° C. The steroid to be 2β-hydroxylated is added to the nutrient medium and fermentation is carried out with *Streptomyces griseus*. The transformation taking place in the reaction medium can be traced by paper chromatographic assay and is usually complete within about four days. In carrying out the process of the present invention, *Streptomyces griseus* (strain A–1) (ATCC No. 13968) has been found to give good results. During the growth of the organism under favorable conditions, a hydroxyl group is introduced into the 2β-position of the steroid ring A. The exact mechanism of this 2β-hydroxylation is not known but is believed to be an enzymatic reaction.

A suitable nutrient medium for the fermentation of the present invention contains a soluble source of carbon, nitrogen and mineral trace elements. Sources of carbon include sugars such as glucose, sucrose, maltose, dextrose, xylose, galactoses and so forth. Also, alcohols such as glycerol or mannitol, corn starch, etc., organic acids such as citric acid, maleic acid, acetic acid and various natural products containing carbohydrates such as corn steep liquor, soya bean meal, cotton seed meal and many available materials which have been used heretofore as a source of carbon in fermentation processes. Usually a variety of the above carbon sources are used in a medium which gives the best results. Suitable sources of nitrogen include some of the above named materials such as corn steep liquor, soya bean meal, cottonseed meal and the like and various other substances such as beef extract, casein, yeast, enzymatically digested proteins and degradation products including peptones, amino acids and many other available proteinaceous materials which have been found to be suitable in supporting the growth of *Streptomyces griseus*. Inorganic sources of nitrogen include urea, ammonium salts, nitrates and the like. The latter may be used in the medium as a source of nitrogen to provide a favorable growth medium for the organisms.

The mineral requirements of fermentation are usually supplied in the crude materials which are often used as sources of carbon and nitrogen or in the water that is used in the process. However, it is often advisable to supplement the minerals normally present with added amounts to obtain maximum growth. Cations and anions which may be desirable in added amounts include sodium, potassium, calcium, magnesium, phosphate, sulfate, chloride, cobalt, manganese and various others. The use of elements such as boron, copper, molybdenum and chromium is often desirable.

The growth of the organism takes place under aerobic conditions, and aeration in flasks, for example, can be achieved by agitation on a reciprocating or rotary shaker or in bottles or tanks by forcing sterile air through the fermentation mixture. It is desirable that the sterile air be forced through the medium in an amount of from ⅓ to 2 volumes of air per volume of medium per minute. Agitation in the bottles or fermenter tanks is provided by a mechanical impeller. While the organism will grow at temperatures between 5° and 45° C., it is preferable to carry out the process as stated hereinbefore at a temperature of from about 20° to about 40° C.

The Δ⁴ steroids of the pregnene series which can be used in the process of the present invention include, for example, 11β,17α,21-trihydroxy-4-pregnene - 3,20 - dione; 11β,21-dihydroxy-4-pregnene - 3,20 - dione; 17α,21-dihydroxy-4-pregnene - 3,20 - dione; 11α,17α,21-trihydroxy-4-pregnene - 3,20 - dione; 11β,16α,17α,21 - tetrahydroxy-4-pregnene - 3,20 - dione; 9α-fluoro-11β,16α,17α,21-tetrahydroxy-4-pregnene - 3,20 - dione; 16α,17α,21-trihydroxy-4-pregnene-3,11,20-trione; 17α,21-dihydroxy - 4 - pregnene-3,11,20-trione; 4-androstene - 3,17 - dione; 17β-hydroxy - 4 - androstene-3-one; 4-pregnene-3,20-dione; 21-hydroxy - 4 - pregnene-3,20-dione; 9α-fluoro-11β,21-dihydroxy-16α,17α-isopropylidenedioxy - 4 - pregnene-3,20-dione; 11β,21-dihydroxy - 16α,17α - isopropylidenedioxy-4-pregnene-3,20-dione; 9α - fluoro - 11β,21 - dihydroxy-16α,17α - isopropylidenedioxy - 1,4 - pregnadiene-3,20-dione and 6α,9α - difluoro-11β,21-dihydroxy-16α,17α-isopropylidenedioxy-4-pregnene-3,20-dione and esters thereof and the like. When using the above steroid substrates in the fermentation, the products formed are the free alcohols of these steroids. It is generally desirable that the steroids be added to the fermentation in solution or in finely divided form. A preferred method is to dissolve in methanol or other water miscible solvents and add it to the fermentation medium at the desired stage in the process. Although the steroid may precipitate from solution when so added it is dispensed throughout the medium as a fine suspension and becomes readily available to the organism for oxidation. The amount of steroid added to the fermentation may vary considerably, but it is generally on the order of 1/10 to 1 gram per liter of medium.

To prepare inocula, 1.0 ml. of washed spore and cell suspension of the *Streptomyces griseus* (strain A-1) is used to inoculate 100 ml. of sterile medium such as described in the examples hereinafter in a 500 ml. flask. The medium is sterilized by autoclaving for 15 minutes at 15 pounds steam pressure (120° C.). The inoculated flask is incubated at about 28° C. on a shaker for about 24-72 hours. Such inocula may be used to inoculate larger batches of sterile medium in bottles and such bottle cultures, after fermentation, may be used to inoculate large batches of medium in fermenter tanks.

During the fermentation process, it may be desirable to add anti-foaming agents such as silicones, glyceride oils and the like. These compounds are added from time to time in the amounts needed. In the process of the present invention, the 100 ml. batches of inoculated medium in 500 ml. flasks are usually incubated for a period of 16 to 40 hours at a temperature of about 28° C. At this point, 10 mg. of substrate steroid dissolved in 1 ml. of methanol is added to each flask and the fermentation continued at about 28° C. The fermentation is allowed to proceed for a period of time long enough to achieve maximum conversion of the steroid substrate to the corresponding $2\beta$-hydroxy steroid. This period may vary from several hours to 144 hours or longer.

At the conclusion of the fermentation process the $2\beta$-hydroxylated steroid is recovered from the fermentation medium by the following procedure. The contents of the fermentation tube are extracted with three volumes of ethyl acetate. The ethyl acetate phase is evaporated to dryness and the residue dissolved in an appropriate volume of a mixture consisting of a 1:1 ratio of water-saturated ethyl acetate and methanol. This solution is used for characterization of steroid content as described hereinafter.

In large scale fermentations, the crude product or products may be recovered from the fermentation beer by simple solvent extraction using a water immiscible solvent such as, for example, chlorinated hydrocarbons, alcohols, esters, ketones and so forth. Further purifications and separations of the steroid products from extractions may be accomplished by methods well known to those skilled in the art. Separation and purification of steroid mixtures often require the use of chromatography.

The $2\beta$-hydroxylating process of the present invention is useful for preparing products that are active glucocorticoids and can be employed as chemotherapetuic agents useful in the same manner as cortisone or hydrocortisone for the treatment of arthritis, bursitis, burns and the like. The compounds prepared by the process of the present invention contains a $2\beta$-hydroxy group which enhances water solubility making the compounding of pharmaceutical preparations less difficult. Also, the enhanced water solubility favorably affects the in vivo activities of $16\alpha,17\alpha$-isopropylidenedioxy steroids in humans.

The following examples illustrate in detail the preparation of $2\beta$-hydroxy steroids from the corresponding steroids of the pregnane series.

EXAMPLE 1

*Preparation of $9\alpha$-Fluoro-$2\beta,11\beta,21$-Trihydroxy-$16\alpha,17\alpha$-Isopropylidenedioxy-4-Pregnene-3,20-Dione*

One hundred ml. of sterile medium (No. 60) consisting of soybean meal, 0.22%, corn steep liquor, 0.3%, glucose, 1.0%, yeast extract, 0.25%, ammonium biphosphate, 0.3%, and calcium carbonate, 0.25%, adjusted to pH 7.0 with sodium hydroxide in a 500 ml. Erlenmeyer flask is inoculated with 1 ml. of a 72 hour mycelial growth of *Streptomyces griseus* (strain A-1) (ATCC No. 13968). The flask is placed on a reciprocating shaker at 28° C. for 16 hours. At this time, 10 mg. of $9\alpha$-fluoro-$11\beta,21$-dihydroxy-$16\alpha,17\alpha$-isopropylidenedioxy-4-pregnene-3,20-dione dissolved in 1 ml. of methanol is added. Shaking is continued for 72 hours at which time paper chromatographic assays show a 25% yield of $9\alpha$-fluoro-$2\beta,11\beta,21$-trihydroxy-$16\alpha,17\alpha$-isopropylidenedioxy-4-pregnene-3,20-dione.

EXAMPLE 2

*Preparation of $9\alpha$-Fluoro-$2\beta,11\beta,21$-Trihydroxy-$16\alpha,17\alpha$-Isopropylidenedioxy-4-Pregnene-3,20-Dione*

The pH of the medium consisting of soybean meal, 0.22%, dextrose, 1.0%, corn steep liquor, 0.3%, yeast extract, 0.25% and ammonium biphosphate, 0.3% is adjusted to about 7.0 before adding the calcium carbonate 0.25%. The inoculum is grown for 72 hours on a reciprocating shaker. At the end of this period of time, the inoculum is transferred to a five gallon bottle containing 12 liters of the above medium. After a further 16 hours, 2.5 g. of $9\alpha$-fluoro-$11\beta,21$-dihydroxy-$16\alpha,17\alpha$-isopropylidenedioxy-4-pregnene-3,20-dione dissolved in 100 ml. of methanol is added to the bottle. Conversion is allowed to continue for 81 hours, at which time the bottle is harvested.

Two such bottles are fermented each with 2.5 g. of steroid. The combined bottles are extracted with an equal volume (22 liters) of ethyl acetate and then filtered. The ethyl acetate phase is separated and the fresh cake mixed with 10 liters of ethyl acetate. The filtrate is extracted twice more with ethyl acetate, 22 liters each time. The combined ethyl acetate extracts are concentrated to a residue.

The residue is treated with 1.5 liters of a solution of 80 parts of methanol and 20 parts water by volume. The soluble portion is extracted twice with 500 ml. portions of carbon tetrachloride to remove oily substances. The carbon tetrachloride extract is discarded. The methanolic solution is concentrated to a residue under reduced pressure and chromatographed in a column of 600 g. of diatomaceous earth (Celite 545), moistened with the lower phase of a mixture of 1 part water, 5 parts dioxane and 6 parts cyclohexane. The column is developed with upper phase of the same system and the peak at 3.8 column retention volumes is collected and concentrated to dryness under reduced pressure. The residue is dissolved in acetone and the solution allowed to stand until crystals formed. The crystals thus obtained are recrystallized from acetone and have a melting point of 260-261° C., $[\alpha]+12.9°$ in methanol, $\lambda_{max.}^{MeOH}$ 239 m$\mu$, $\epsilon=14,200$, $\lambda_{max.}^{KBr}$ 2.91, 5.81, 5.95, 6.12, 9.24 9.45 (polyhydroxy $\Delta^4$-3,20-dione)

On the basis of the large change in molecular rotation compared with the starting material ($-541°$) and the ultraviolet absorption spectrum in alkaline ethanol characteristic of $2\beta$-hydroxy (cf. A. S. Meyer J. Org. Chem. 20: 1240 (1955)), the compound is assigned the structure $9\alpha$-fluoro-$2\beta,11\beta,21$-trihydroxy-$16\alpha,17\alpha$-isopropylidenedioxy-4-pregnene-3,20-dione.

EXAMPLE 3

*Preparation of $2\beta,11\beta,21$-Trihydroxy-$16\alpha,17\alpha$-Isopropylidenedioxy-4-Pregnene-3,20-Dione*

The above compound is prepared by fermenting $11\beta,21$-dihydroxy-$16\alpha,17\alpha$-isopropylidenedioxy-4-pregnene-3,20-dione in sterile medium No. 60 with *Streptomyces griseus* (strain A-1) for 120 hours. Following completion of the fermentation, the desired product is recovered as described in Example 2.

EXAMPLE 4

*Preparation of 9α-Fluoro-2β,11β,21-Trihydroxy-16α,17α-Isopropylidenedioxy-1,4-Pregnadiene-3,20-Dione*

To sterile fermentation medium No. 60 is added 9α-fluoro - 11β,21 - dihydroxy - 16α,17α - isopropylidenedioxy-1,4-pregnadiene-3,20-dione and the fermentation carried out as described in Example 2 with *Streptomyces griseus* (strain A-1) for 96 hours. The desired product is then obtained from the fermentation medium as described in Example 2.

EXAMPLE 5

*Process of Preparing 6α,9α-Difluoro-2β,11β,21-Trihydroxy - 16α,17α - Isopropylidenedioxy-4-Pregnene-3,20-Dione*

This product is obtained by the fermentation of 6α,9α-difluoro - 11β,21 - dihydroxy - 16α,17α - isopropylidenedioxy-4-pregnene-3,20-dione in sterile medium No. 60 with *Streptomyces griseus* (strain A-1) for 144 hours. The product is isolated from the fermentation medium as described in Example 2.

We claim:

1. A process of preparing compounds having the formula:

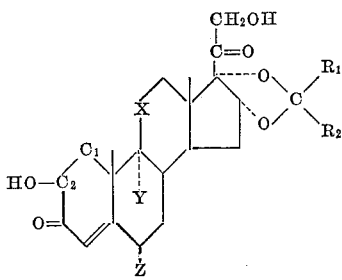

wherein $C_2$—$C_1$ is a divalent radical selected from the group consisting of —$CH_2$—$CH_2$— and —CH=CH— radicals, X is a radical selected from the group consisting of

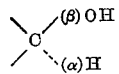

and O=C< radicals, Y and Z are selected from the group consisting of hydrogen and halogen atoms and $R_1$ and $R_2$ are lower alkyl radicals which comprises subjecting to oxidative fermentative conditions a steroid of the formula:

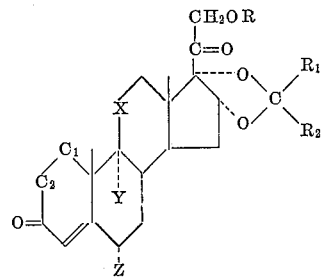

wherein $R_1$, $R_2$, X, Y, Z and $C_2$—$C_1$ are as defined above and R is selected from the group consisting of hydrogen and lower alkanoyl radicals in the presence of *Streptomyces griseus* (ATCC 13968) and recovering said compound therefrom.

2. A process of preparing 2β,11β,21-trihydroxy-16α,17α-isopropylidenedioxy-4 - pregnene - 3,20 - dione which comprises subjecting 11β,21-dihydroxy - 16α,17α - isopropylidenedioxy-4-pregnene-3,20-dione to oxidative fermentative conditions in the presence of *Streptomyces griseus* (ATCC 13968) and recovering said compound therefrom.

3. A process of preparing 9α-fluoro-2β,11β,21-trihydroxy-16α,17α-isopropylidenedioxy - 1,4 - pregnadiene - 3, 20-dione which comprises subjecting 9α-fluoro-11β,21-dihydroxy-16α,17α-isopropylidenedioxy - 1,4 - pregnadiene-3,20-dione to oxidative fermentative conditions in the presence of *Streptomyces griseus* (ATCC 13968) and recovering said compound therefrom.

4. A process of preparing 6α,9α-difluoro-2β,11β,21-trihydroxy-16α,17α-isopropylidenedioxy-4 - pregnene - 3,20-dione which comprises subjecting 6α,9α-difluoro-11β,21-dihydroxy-16α,17α-isopropylidenedioxy-4-pregnene - 3,20-dione to oxidative fermentative conditions in the presence of *Streptomyces griseus* (ATCC 13968) and recovering said compound therefrom.

References Cited in the file of this patent
UNITED STATES PATENTS

| | | |
|---|---|---|
| 2,753,290 | Fried et al. | July 3, 1959 |
| 2,915,439 | Perlman | Dec. 1, 1959 |